June 16, 1942. L. S. FALLS 2,286,477
COMBINED THREADING AND FACING DEVICE
Filed April 28, 1941 2 Sheets-Sheet 1

INVENTOR.
Lorne Secord Falls.
BY Barnes, Kisselle, Laughlin & Raisch
Attorneys.

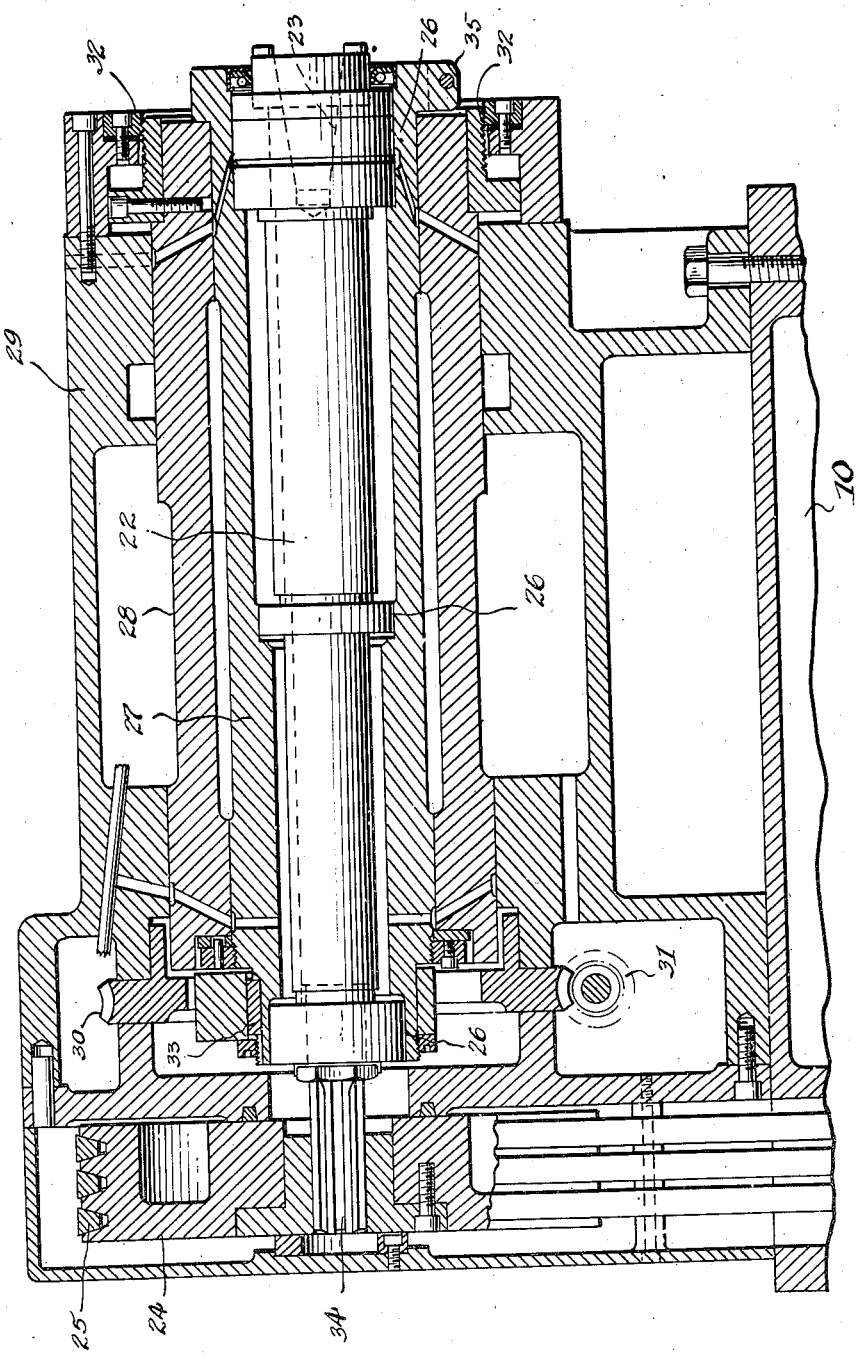

Patented June 16, 1942

2,286,477

UNITED STATES PATENT OFFICE 2,286,477

COMBINED THREADING AND FACING DEVICE

Lorne Secord Falls, Windsor, Ontario, Canada

Application April 28, 1941, Serial No. 390,711

12 Claims. (Cl. 10—154)

This invention relates to a combination of a planetary milling machine and a multiple purpose tool.

Planetary milling machines in general are known to be old. The present invention, however, utilizes a planetary milling machine which is adapted automatically to return to center or to a set eccentricity in combination with a multiple purpose tool to assure fast production and proper alignment of the various operations performed by the tool.

For purposes of description, a dual purpose tool will be referred to and the several operations will be described as threading and facing operations. The dual purpose tool will be described as a combined hobbing and facing tool.

It is an object of this invention to utilize planetary motion and rotary motion to perform subsequent operations upon a work piece. It is a further object of the invention to assure exact and automatic alignment of the several operations performed upon the work piece.

In the drawings:

Fig. 3 is a vertical section of the planetary milling machine of Fig. 2 and is taken along the lines 3—3 of Fig. 2.

Figure 1:
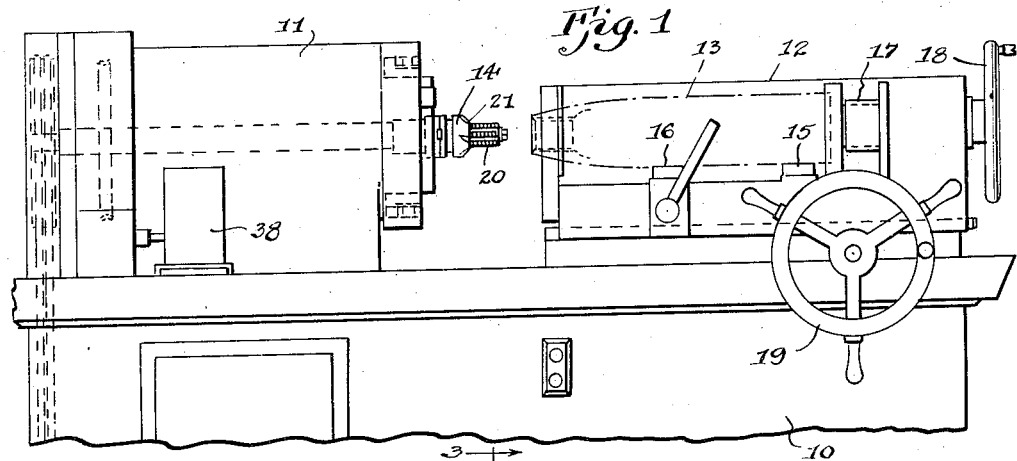
Fig. 1 is a general view showing a milling machine and a slidable work holding arbor.

Referring to Fig. 1 it will be seen that a suitable supporting means 10 is provided with a planetary milling machine 11 and a work arbor 12 slidably mounted upon the support 10. An artillery shell 13 is illustrated as the work piece. A combined hobbing and facing tool 14 is provided on the planetary milling machine. The usual means to mount the artillery shell 13 are shown as support 15, adjustable support 16 and an adjustable backing 17 controlled by wheel 18. A hand wheel 19 is provided to facilitate sliding the work arbor. Suitable gearing and rack means (not shown) operatively connect the wheel 19 and work arbor 12.

Figures 4, 5:
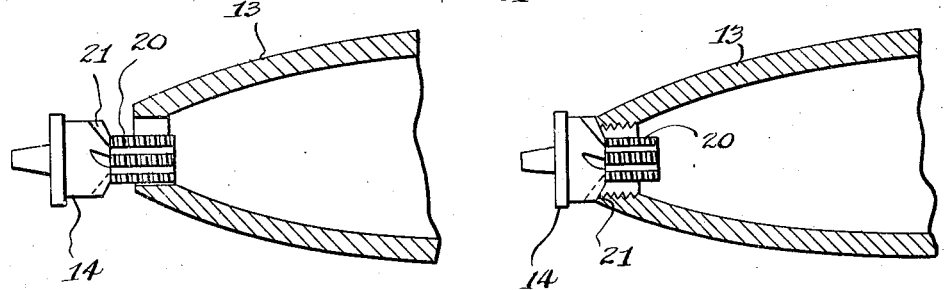
Fig. 4 shows the hobbing tool in position to thread the work piece.
Fig. 5 shows the tool in position to face the work piece co-axial with the threading portion.

In the production of artillery shells it is necessary to provide a theraded and faced opening for the shell cap. This opening is adjacent the apex of the shell and is illustrated in Figs. 4 and 5. The combined threading and facing tool and planetary milling machine will be described in connection with the performance of the threading and facing operations upon the artillery shell.

In the preparation of the threaded and faced hole of the artillery shell, planetary motion of the hobbing surface 20 of the combined hobbing and facing tool threads the shell. A planetary milling machine is adapted to furnish the planetary movement. The facing of the artillery shell is done by a rotary movement of the facing surface 21 of the combined hobbing and facing tool. During the facing operation the only motion of the tool is rotary and the work is moved into engagement with the facing surface of the tool. By using this hobbing and facing tool on a planetary milling machine capable of automatically returning to center the co-axial alignment of the threaded surface and the faced surface is assured. It is to be understood that a tool with a counter-sinking surface instead of the facing surface 21 could be used without departing from the invention. The invention could also be used to form a recess having at least two sections, one of the sections being of a larger diameter than the other and the smaller of said sections lying within the periphery of the larger.

Figure 2:
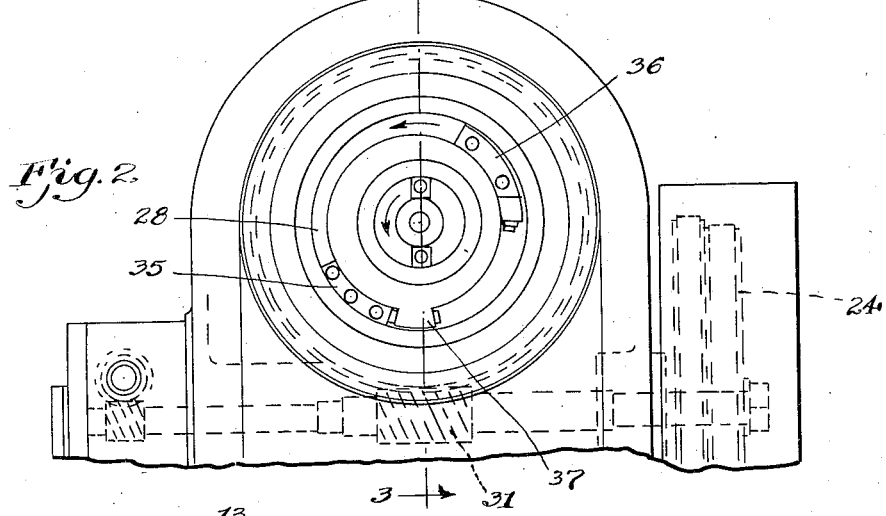
Fig. 2 is an end view of a portion of the planetary milling machine with the tool removed.

Referring to Figs. 2 and 3, a planetary milling machine adapted to automatically return to center will be described. An inner rotatable shaft 22 is provided with an opening 23 adapted to receive the tool. Slidably keyed upon the shaft is a pulley wheel 24 adapted to be rotated by belts 25 driven by a suitable power source, such as an electric motor, not shown. It is to be understood that the means of rotating the shaft 22 is not material. A sprocket drive or system of gears or any other suitable driving means could be substituted for the pulley and belts shown. Suitable bearings 26 are preferably provided for the shaft 22. An eccentric housing 27 is circumferentially mounted about shaft 22. It would be possible to have the shaft 22 and eccentric housing 27 co-axial, but in the preferred construction the shaft 22 is eccentrically mounted within the housing 27. The housing 27 is eccentrically mounted within an outer or main housing 28. The outer or main housing 28 is rotatably mounted within a frame structure 29. The shaft 22 containing the tool is co-axial with the outer housing 28 in the position shown in Fig. 2 and the housing 27 is eccentric relative to both the outer housing 28 and the shaft 22. Suitable means are provided to rotate the housing 27 within the housing 28. The means shown comprise a worm gear 30 and worm 31 powered by a suitable source not shown.

It will thus be seen that the shaft 22 may alone be rotated and the tool will be subject to but a simple rotation. The housing 27 may be rotated and will thereby position the tool off center relative to the outer housing 28. If then the outer housing 28 and and the eccentric housing 27 are rotated as a unit, the tool will revolve and may be simultaneously rotated by wheel 24.

The outer housing 28 and frame 29 are provided with cooperating threaded surfaces 32 which cause a longitudinal movement of the housing 28, housing 27 and shaft 22 when the housing 28 is rotated. This provides the forward motion necessary in a threading operation. Keyways 33 and 34 on the eccentric housing and the inner shaft, respectively, permit this longitudinal motion relative to the driving means.

The outer housing 28 has been referred to as rotating and the means to rotate it will now be described. Referring to Fig. 2 the main or outer housing 28 is provided on its end face with two adjustable dog members 35 and 36. The eccentric housing 27 is provided with a dog 37 on its end face. It will thus be seen that when the eccentric housing 27 is rotated by the worm gear 30 it may rotate through the arc of a circle and will then engage a dog member upon the outer housing. When the dog 37 engages a dog member, such as the member 36, the outer housing 28 is forced to rotate with the eccentric housing 27.

The threading operation performed by the hobbing tool of Fig. 4 is performed when the hobbing tool simultaneously rotates and revolves and is subject to longitudinal movement. The above description has described a means for imparting these motions to the hobbing tool.

When the surface has been threaded, the planetary milling machine may be automatically returned to center by reversing the direction of rotation of the worm 31. Timing means, such as an electric timer diagrammatically indicated at 38, may be provided to actuate the reversing means (not shown). When the worm 31 is reversed, the eccentric housing 27 will be rotated in an opposite direction and the dog 37 will engage the dog member 35. The dog member, which is adjustable, may be positioned so that this engagement will occur when the tool is concentric with the outer housing 28 so that the tool will rotate about its own axis. The main or outer housing 28 is, therefore, rotated in an opposite direction and will be retracted longitudinally by the threaded surfaces 32. The work supporting arbor may then be moved to the left in Fig. 1 to bring the work into engagement with the facing surface of the tool and the shaft 22 rotated by wheel 24.

If desired, the worm 31 may be locked in position when the main or outer housing is retracted.

It is to be understood that the facing operation or its equivalent could be performed first and the threading second if desired. That is, the operation performed by simple rotation of the tool could be performed first and then the worm 31 actuated to rotate the housing 27 which would eventually engage dog member 36 and rotate the outer housing giving the tool simultaneously a rotating and revolving motion and a longitudinal feed whereby the threading or equivalent operation could be performed.

If it is desired to change the pitch upon the threads to be cut in the work, the threaded surfaces 32 may be removed. To this end the elements provided with the threaded surfaces are removably mounted adjacent the end surfaces of the housings.

It should be noted that the dog members 35 and 36 are adjustable about the periphery of the main or outer housing. If it is desired that the two operations referred to be performed on different axes, it would, of course, be possible to adjust the members 35 and 36 so that the lug 37 on the eccentric housing would pick up the main or outer housing at two different eccentricities. This would be an alternative use of the device rather than to have it return to center.

What I claim is:

1. The combination of a tool provided with two working surfaces, means to rotate continuously said tool whereby work may be performed with one of said surfaces by a rotating movement when said tool is aligned with the work, selective means to impart a revolving motion to said tool while said tool is rotating whereby work may be performed with the other of said surfaces independently of said first surface.

2. The combination of a tool provided with two working surfaces, a planetary milling machine adapted to rotate continuously said tool about its axis, said milling machine being adapted to selectively revolve said tool simultaneously with its rotation whereby work may be performed with one of said surfaces and means to center said tool on the axis about which it was revolved while said tool is rotating whereby work may be performed with the other of said surfaces without interruption.

3. The combination of a tool provided with two working surfaces and a planetary milling machine, said milling machine comprising a rotatable main housing, a secondary housing eccentrically mounted in the main housing, a shaft rotatably mounted within the secondary housing, means on said shaft to receive said tool, means to rotate continuously said shaft whereby a work operation may be performed by one of said tool surfaces by said rotating movement upon relative axial alignment between said tool and a work piece, means to rotate said secondary housing in one direction relative to said main housing, means to rotate said main housing whereby said tool will be revolved and rotated and work may be performed by said second surface of said tool, means to rotate said secondary housing in a second direction relative to said main housing and means to limit said rotation in said second direction whereby the alignment of the work performed by the two surfaces may be controlled.

4. The combination of a tool having two working surfaces and a planetary milling machine comprising a rotatable main housing, a secondary housing eccentrically mounted in said main housing, a shaft rotatably mounted in said secondary housing and adapted to receive said tool, means to rotate continuously said shaft, means to rotate said secondary housing in one direction relative to said main housing, means to rotate said main housing to revolve said tool, means to move said tool longitudinally, means to rotate said secondary housing in a second direction relative to said main housing, means to limit said rotation in a second direction when said tool is centered on the axis about which is was revolved whereby work may be performed by one surface of said tool while said tool is rotated on said axis and work may be performed by the second surface of said tool while said tool is simultaneously rotated, revolved and fed longitudinally.

5. The method of threading and facing a work piece with a tool having two working surfaces comprising rotating and continuously revolving one surface of said tool relative to said work and subsequently aligning said tool with the axis about which it was revolved while said tool is rotating and facing said work with the second surface.

6. The method of threading and facing a work piece with a tool having two working surfaces comprising simultaneously rotating, revolving and longitudinally feeding one surface of said tool relative to said work and subsequently aligning said tool with the axis about which it was revolved, continuously rotating said tool, moving said work piece into engagement with said second surface and facing said work piece with the second surface.

7. The combination of a tool provided with two working surfaces, means to create relative rotation between said tool and the work, means to contact one of the tool surfaces with the work during the rotation to effect a work operation on the work piece upon relative axial alignment between the tool and the work, selective means to create simultaneous relative revolution and rotation between said tool and said work, means to contact the other of said tool surfaces with the work during the said revolution and rotation whereby work may be performed with said other tool working surface.

8. The combination of a tool provided with a cylindrical portion having a hobbing surface about its periphery and a laterally extending cutter coaxial with said cylindrical portion and positioned at the end thereof, and a planetary milling machine adapted to simultaneously rotate, revolve and longitudinally move said tool whereby said hobbing surface may thread said work, said milling machine being adapted to center said tool on the axis about which it was revolved and rotate said tool about its own axis, means to engage said work and said cutter whereby said work is cut coaxial with the threaded portion of said work.

9. The method of treating work pieces having an opening by internally threading the work piece about the opening and machining the exterior surface of the work piece around the opening by the use of a tool having a cylindrical first working surface and a laterally extending second working surface of larger diameter than said first working surface, comprising continuously rotating said tool, engaging said first working surface with the portion of the work piece forming the opening, simultaneously rotating, revolving and longitudinally moving said tool whereby the surface of the work piece forming said opening is threaded, centering said tool on the axis about which it was revolved, engaging said rotating second working surface with the exterior portion of the work piece around the opening whereby said exterior surface is machined.

10. The method of shaping a work piece to machine work piece surfaces forming a recessed formation having at least two sections, one of said sections being larger than the other and the smaller of said sections lying within the periphery of the larger, by the use of a tool having a cylindrical first working surface and a second working surface of larger diameter than said first working surface, said first tool working surface being of smaller diameter than one of said sections, comprising engaging said first tool working surface with the work piece surface forming said smaller section, continuously rotating said tool, selectively revolving said rotating tool whereby the said work piece surface is machined, varying the eccentricity of said tool relative to said work piece, engaging the second rotating tool working surface with the surface of said larger section and machining the surface forming said larger section.

11. The combination of a tool provided with a threading surface and a facing surface, a planetary milling machine adapted to revolve and to rotate continuously said tool, whereby work may be performed by said threading surface, said milling machine being adapted to center said tool on its axis of revolution while said tool is rotating, whereby work may then be performed by said facing surface immediately upon the centering of said tool.

12. In a device adapted to perform work upon a work piece having a round surface forming an opening and a second work surface to be machined, the combination of a tool provided with a cylindrical first portion having a working surface about its periphery, and a second portion coaxial with said first portion and positioned at one end thereof, said second portion having a larger diameter than said first portion and being provided with a working surface, said first tool portion having a smaller diameter than said opening in said work piece, said second tool portion having substantially the same diameter as said second work surface to be machined, and a planetary milling machine adapted to rotate continuously said tool and selectively revolve said tool, whereby said first tool portion operates on said round surface of said work piece while said tool is rotated and revolved, said milling machine being adapted to center said tool about on the axis upon which it was revolved, means to engage said second working surface and said rotated second tool portion, whereby said second work surface is machined coaxial with said round work surface.

LORNE SECORD FALLS.